(12) United States Patent
Rao

(10) Patent No.: US 7,637,093 B2
(45) Date of Patent: Dec. 29, 2009

(54) HUMID AIR TURBINE CYCLE WITH CARBON DIOXIDE RECOVERY

(75) Inventor: Ashok Rao, Rancho Santa Margarita, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 0 days.

(21) Appl. No.: 10/549,017

(22) PCT Filed: Mar. 18, 2003

(86) PCT No.: PCT/US03/08340

§ 371 (c)(1), (2), (4) Date: Jul. 5, 2006

(87) PCT Pub. No.: WO2004/083615

PCT Pub. Date: Sep. 30, 2004

(65) Prior Publication Data

US 2006/0260290 A1    Nov. 23, 2006

(51) Int. Cl.
*F02C 3/30* (2006.01)
*F02C 3/34* (2006.01)
*F02C 7/10* (2006.01)

(52) U.S. Cl. ............... 60/39.52; 60/39.53; 60/39.55
(58) Field of Classification Search ............. 60/39.52, 60/39.53, 775, 784, 39.55
See application file for complete search history.

(56) References Cited

U.S. PATENT DOCUMENTS

| | | | | |
|---|---|---|---|---|
| 4,528,811 | A * | 7/1985 | Stahl | 60/784 |
| 5,160,096 | A * | 11/1992 | Perkins et al. | 60/775 |
| 5,513,488 | A * | 5/1996 | Fan | 60/775 |
| 6,256,976 | B1 * | 7/2001 | Kataoka et al. | 60/39.53 |
| 6,269,624 | B1 * | 8/2001 | Frutschi et al. | 60/39.52 |
| 6,578,354 | B2 * | 6/2003 | Hatamiya et al. | 60/39.53 |
| 6,868,677 | B2 * | 3/2005 | Viteri et al. | 60/784 |
| 2001/0042367 | A1 * | 11/2001 | Frutschi et al. | 60/39.02 |

* cited by examiner

*Primary Examiner*—Ted Kim
(74) *Attorney, Agent, or Firm*—Fish & Associates, PC

(57) ABSTRACT

Carbon dioxide (152) is removed following compressor (130) which compresses a mixture of compressed air (132) and recirculated exhaust gas (118') from a gas turbine (120). The carbon dioxide depleted gas (136) is humidified (180, 114) and fed to the combustor (110).

16 Claims, 3 Drawing Sheets

HUMID AIR TURBINE CYCLE WITH CARBON DIOXIDE RECOVERY

FIELD OF THE INVENTION

The field of the invention is carbon dioxide recovery, and especially carbon dioxide recovery from humid air turbine cycle.

BACKGROUND OF THE INVENTION

Combustion gases, and especially flue gases from gas turbines often comprise a substantial quantity of carbon dioxide, which is a known greenhouse gas. Thus, isolation and/or sequestration of carbon dioxide from combustion processes has gained significant attention over the last decade, and there are numerous configurations and methods known in the art to remove carbon dioxide from a flue gas.

For example, carbon dioxide may be removed from various gas streams with one or more membranes as described in U.S. Pat. No. 4,130,403 to Cooley et. al., U.S. Pat. No. 4,639,257 to Duckett et. al., or U.S. Pat. No. 5,233,837 to Callahan. Membrane processes typically exhibit relatively high selectivity towards a particular gas component. Moreover, membrane processes can generally be operated without energy consuming circulation (e.g, heating and/or cooling requirements that are often needed for solvent based carbon dioxide removal). However, and especially depending on the feed gas composition, membrane life time is less than desirable, or the feed gas requires pretreatment before contacting the membrane. Furthermore, membrane systems typically operate at a relatively high pressure differential, which either necessitates a blower or other pressure increasing equipment for low pressure feed gases or disqualifies membrane systems for such low pressure feed gases.

Alternatively, carbon dioxide may be removed using physical or chemical solvents, and numerous process configurations for solvents are known in the art. Physical solvent processes are particularly advantageous where the acid gas partial pressure in the feed gas is relatively high. Thus, all, or almost all physical solvents exhibit only limited usefulness for the removal of carbon dioxide from flue gases which are typically near atmospheric pressure, and especially where the flue gas has a relatively low carbon dioxide content.

To circumvent problems associated with the use of physical solvents, chemical solvents may be employed to scrub the feed gas, wherein the chemical solvent is regenerated downstream to recover the carbon dioxide. Scrubbing gases with chemical solvents typically allows removal of carbon dioxide from a feed gas at relatively low pressure. However, such methods are often energy intensive as well as costly and problems with corrosion and solvent degradation frequently arise (see e.g., U.S. Pat. No. 2,065,112, U.S. Pat. No. 2,399,142, U.S. Pat. No. 2,377,966, U.S. Pat. No. 4,477,419, or U.S. Pat. No. 3,137,654). Moreover, as the carbon dioxide partial pressure in the feed gas decreases (e.g., the exhaust gas from a gas turbine operated with relatively large amount of excess air, as well as that from a HAT cycle), the size of the recovery equipment as well as the power consumed by a blower typically increases substantially to overcome the pressure drop in the recovery equipment.

Thus, although various carbon dioxide removal configurations and processes are known in the art, all or almost all of them suffer from one or more disadvantages, especially where the partial pressure and/or concentration of the carbon dioxide in the feed gas is relatively low. Therefore, there is still a need to provide improved configurations and methods for carbon dioxide recovery from various gases, and especially gases with relatively low carbon dioxide partial pressure.

SUMMARY OF THE INVENTION

The present invention is directed to methods and configurations of carbon dioxide removal from flue gases in which at least part of the flue gas is compressed to a higher pressure thereby improving carbon dioxide removal efficiency.

In one aspect of the inventive subject matter, a plant will include a combustor that combusts a fuel in the presence of heated humid air to produce an exhaust that is expanded in an expander. A compressor (operationally coupled to the expander) compresses air and at least a portion of the exhaust from the expander to form a compressed mixed gas from which carbon dioxide is removed in an acid gas removal unit, and a humidifier humidifies the so formed carbon dioxide depleted compressed mixed gas to produce the heated humid air.

It is further particularly preferred that in such plants the heated humid air is heated using the exhaust as heat source, and that the humidifier uses water that is heated by at least one of the compressed mixed gas and the exhaust gas. While various methods of acid gas removal are contemplated, preferred acid gas removal units include a membrane unit or employ a solvent (e.g., an amine-based solvent). In alternative configurations, it is contemplated that part of the compressed mixed gas may also be fed to the combustor, and a cooler provides cooling for the expanded exhaust thereby condensing water from the expanded exhaust.

Where the acid gas removal unit comprises an autorefrigeration unit, it is contemplated that the autorefrigeration unit removes carbon dioxide from a first portion of the compressed mixed gas, and that a humidifier humidiiies a second portion of the compressed mixed gas to form the heated humid air.

Thus, it is generally contemplated that a plant may include a turbine combustor, and particularly a humid air turbine combustor that receives fuel and humid carbon dioxide depleted air, wherein at least part of the humid carbon dioxide depleted air is formed from an exhaust gas of the humid air turbine combustor after a portion of the carbon dioxide has been removed for recovery. The carbon dioxide in such configurations is advantageously extracted from the carbon dioxide containing air (mixture of fresh air and recycle flue gas that contains the carbon dioxide) using a membrane unit or a solvent. Viewed from another perspective, contemplated plants in which carbon dioxide is removed from an exhaust gas of a turbine combustor may therefore include a compressor that compresses air and at least a portion of the exhaust gas (recycle gas) to form a compressed mixed gas, wherein carbon dioxide is removed from the compressed mixed gas in an acid gas removal unit.

Various objects, features, aspects and advantages of the present invention will become more apparent from the following detailed description of preferred embodiments of the invention, along with the accompanying drawings in which like numerals represent like components.

DETAILED DESCRIPTION

The inventor has discovered that carbon dioxide contained in the exhaust gas of a gas turbine can be recovered at pressure by recycling at least part of the exhaust gas back to a compressor to increase the partial pressure of the carbon dioxide in the compressed gas, and to thereby facilitate removal of the carbon dioxide using appropriate acid gas removal technologies (e.g., using a physical or chemical solvent, a carbon dioxide specific membrane, or an autorefrigeration process).

Figure 1:
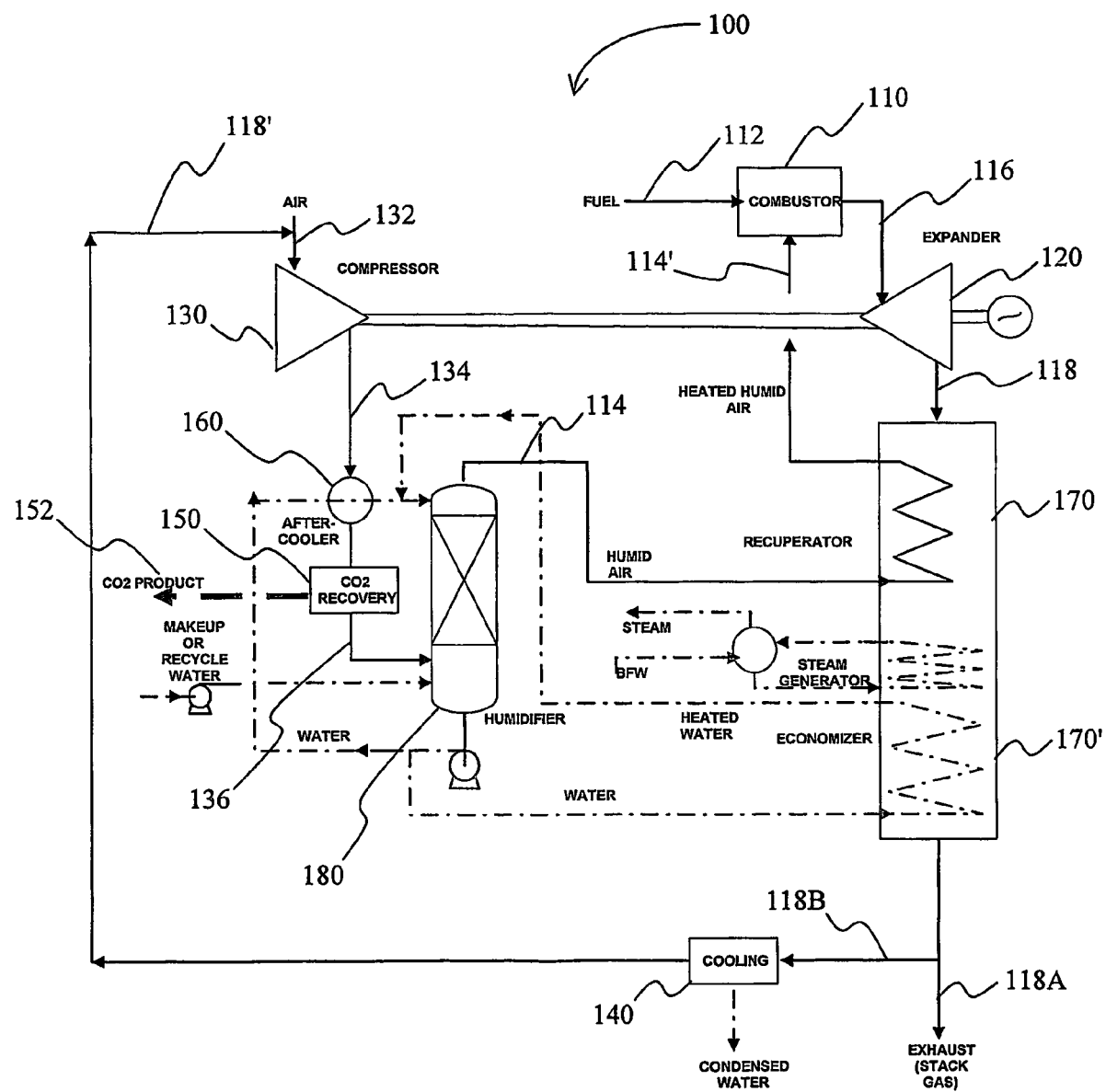
FIG. 1 is a schematic view of an exemplary configuration for carbon dioxide recovery from exhaust gas using a membrane or solvent in the acid gas removal unit.

In one particularly preferred configuration as depicted in FIG. 1, an exemplary plant 100 includes a humid air turbine cycle for generation of power, wherein at least part of the expanded exhaust is recycled back to the compressor for carbon dioxide recovery at elevated pressure. More specifically, the combustor 110 receives fuel 112 and heated humid air 114' and produces exhaust 116 which is subsequently expanded in expander 120. The heat in expanded exhaust 118 is then at least partially recovered in recuperator 170, which heats humid air 114 from humidifier 180, which provides heat for a steam generator, and which further heats water for the humidifier 180 via economizer 170'.

One portion of the expanded and cooled exhaust 11 8A is vented, while another portion of the expanded and cooled exhaust 1 18B is cooled in cooler 140 to form cooled expanded exhaust stream 118' (while condensing and separating out a substantial portion of the water), which is combined with air 132 and compressed in compressor 130 that is operationally coupled to the expander 120. Thus, compressor 130 provides a compressed mixed gas 134 that is cooled in aftercooler 160, thereby heating at least a portion of the water employed in the humidifier. The so cooled compressed mixed gas 134 is then fed to the acid gas removal unit 150 (preferably a solvent based acid gas removal unit or a membrane based carbon dioxide removal unit). Carbon dioxide product stream 152 leaves the plant (e.g., as commercial product) while the carbon dioxide depleted compressed mixed gas 136 is fed to the humidifier 180. Humidifier 180 produces humid gas stream 114 from the carbon dioxide depleted compressed mixed gas 136, wherein the humid gas stream 114 is heated in the recuperator 170 to form heated humid gas stream 114', which is fed into combustor 110 (The terms "humid gas stream" and "humid air" are used interchangeably herein).

Therefore, a plant may comprise a combustor that combusts a fuel in the presence of humid air, wherein the combustor produces an exhaust that is expanded in an expander to form an expanded exhaust; a compressor operationally coupled to the expander, wherein the compressor compresses air and at least a portion of the expanded exhaust to form a compressed mixed gas; an acid gas removal unit that removes carbon dioxide from the compressed mixed gas to form a carbon dioxide depleted compressed mixed gas; and a humidifier that humidifies the carbon dioxide depleted compressed mixed gas to form the humid air.

Figure 2:
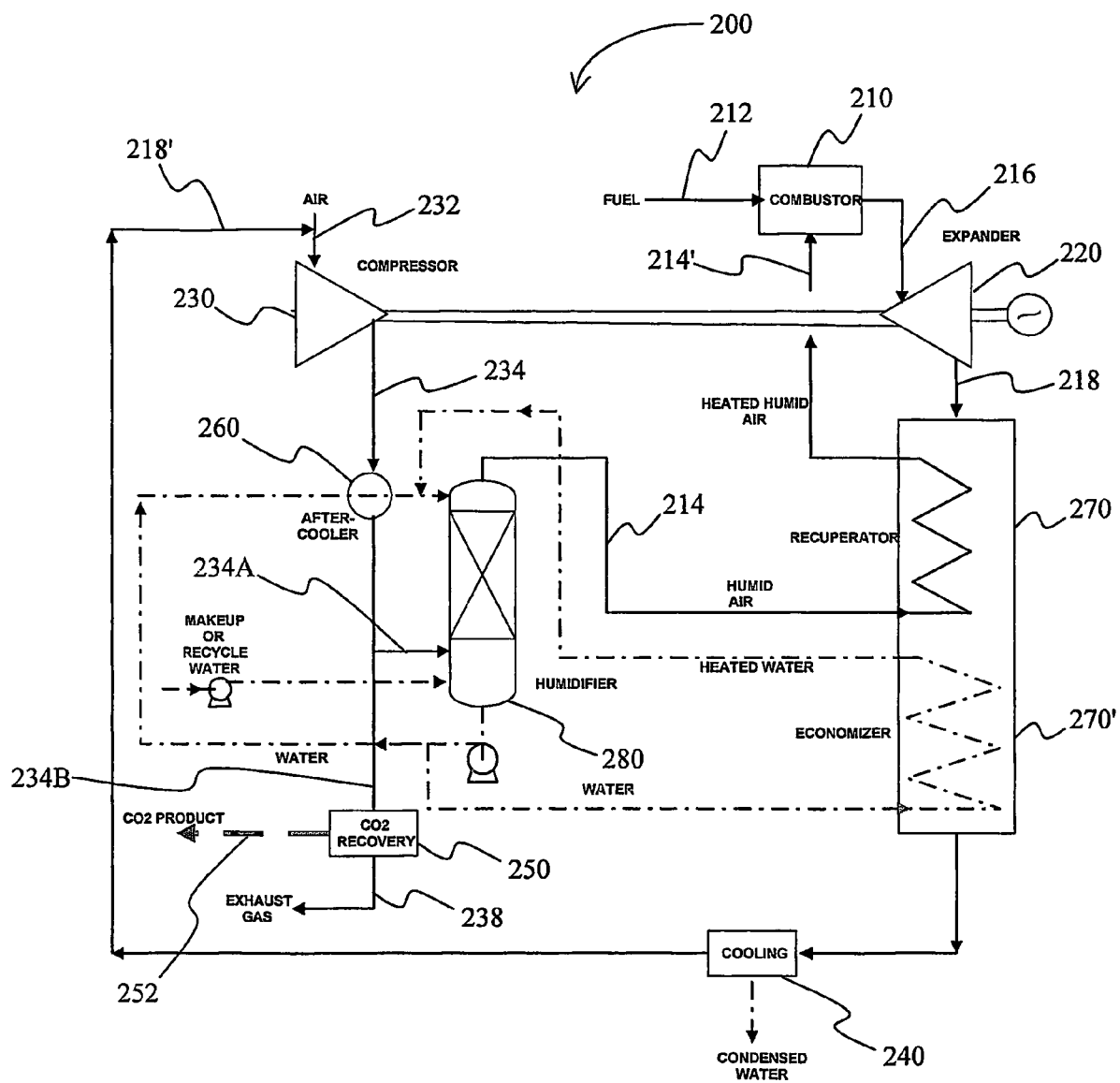
FIG. 2 is a schematic view of an exemplary configuration for carbon dioxide recovery from exhaust gas using an autorefrigeration unit in the acid gas removal unit.

Alternatively, and especially where carbon dioxide is removed in an autorefrigeration unit, an exemplary configuration as depicted in FIG. 2 may be employed. As above, plant 200 includes a humid air turbine cycle for generation of power, wherein at least part of the expanded exhaust is recycled back to the compressor for carbon dioxide recovery at elevated pressure. In such configurations, the combustor 210 receives fuel 212 and heated humid air 214' and produces exhaust 216, which is then expanded in expander 220. The heat in expanded exhaust 218 is then at least partially recovered in recuperator 270, which heats humid air 214 from humidifier 280, which provides heat for a steam generator (not shown), and which further heats water for the humidifier 280 via economizer 270'. The expanded and cooled exhaust 218 is cooled in cooler 240 to form cooled expanded exhaust stream 218' (while condensing and separating out a substantial portion of the water), which is combined with air 232 and compressed in compressor 230 that is operationally coupled to the expander 220. Thus, compressor 230 provides a compressed mixed gas 234 that is cooled in aftercooler 260, thereby heating at least a portion of the water employed in the humidifier.

The so cooled compressed mixed gas 234 is then split into a first stream 234A that is fed to the humidifier 280 and a second stream 234B that is fed to the autorefrigeration unit 250. Carbon dioxide product stream 252 leaves the plant (e.g., as commercial product) while the carbon dioxide depleted exhaust gas 238 leaves the plant as exhaust. Humidifier 280 produces humid gas stream 214 from the first stream 234A, wherein the humid gas stream 214 is heated in the recuperator 270 to form heated humid gas stream 214', which is then fed into combustor 210.

Thus, a plant may include a combustor that combusts a fuel in the presence of humid air, wherein the combustor produces an exhaust that is expanded in an expander to form an expanded exhaust; a compressor operationally coupled-to the expander, wherein the compressor compresses air and at least a portion of the expanded exhaust to form a compressed mixed gas; an autorefrigeration unit that removes carbon dioxide from a first portion of the compressed mixed gas; and a humidifier that humidifies a second portion of the compressed mixed gas to form the humid air.

Figure 3:
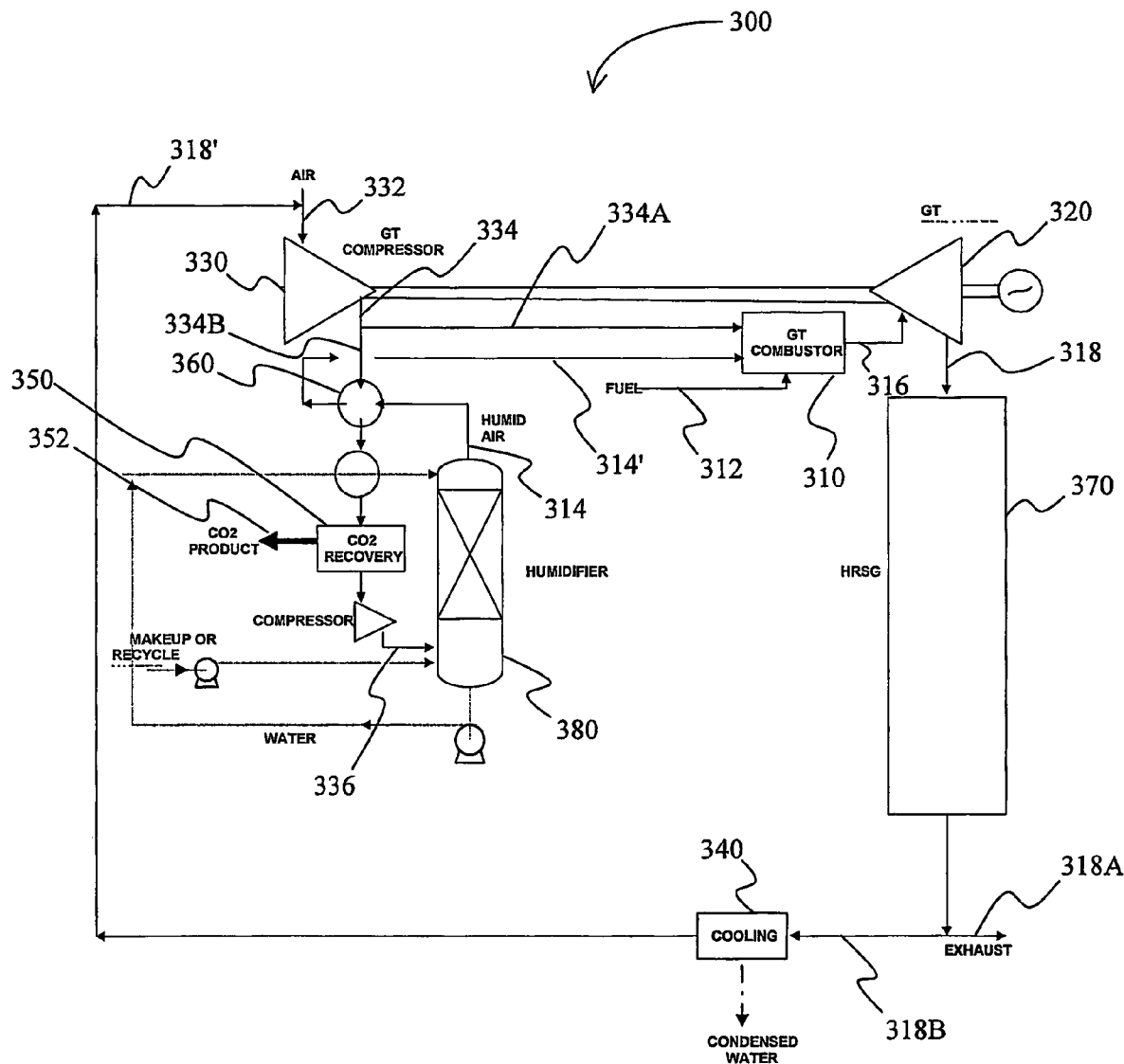
FIG. 3 is a schematic view of another exemplary configuration for carbon dioxide recovery from exhaust gas using partial humidification.

In yet another contemplated configuration, as depicted in FIG. 3, an exemplary plant 300 includes a gas turbine (e.g., the large scale General Electric 7FA+e) with a capability of up to 20 to 30% air extraction in a humid air turbine cycle for generation of power, wherein at least part of the expanded exhaust is recycled back to the compressor for carbon dioxide recovery at elevated pressure. Here, combustor 310 receives fuel 312 and heated humid air 314' to produce exhaust 316 which is expanded in expander 320. The heat in expanded exhaust 318 is at least partially recovered in heat recovery steam generator 370.

One portion of the expanded and cooled exhaust 318A is vented, while another portion of the expanded and cooled exhaust 318B is cooled in cooler 340 to form cooled expanded exhaust stream 318' (while condensing and separating out a substantial portion of the water), which is combined with air 332 and compressed in compressor 330 that is operationally coupled to the expander 320. Thus, compressor 330 provides a compressed mixed gas 334. One portion of the compressed mixed gas 334A is directly fed to the combustor 310 (in a manner similar to what is practiced in conventional gas turbines), while another portion of the compressed mixed gas 334B is cooled in aftercooler 360, thereby heating at least a portion of the water employed in the humidifier. The so cooled compressed mixed gas 334B is then fed to the acid gas removal unit 350 (preferably a solvent based acid gas removal unit or a membrane based carbon dioxide removal unit). Carbon dioxide product stream 352 leaves the plant (e.g., as commercial product) while the carbon dioxide depleted compressed mixed gas 336 is fed to the humidifier 380. Humidifier 380 produces humid gas stream 314 from the carbon dioxide depleted compressed mixed gas 336, wherein the humid gas stream 314 is heated in the aftercooler 360 to form heated humid gas stream 314', which is fed into combustor 310.

Thus, it should be recognized that contemplated configurations significantly facilitate recovery of carbon dioxide contained in flue gas with relatively low carbon dioxide partial pressure, which is particularly desirable in the case of a gas turbine where a large amount of excess air is employed. Consequently, the size of the carbon dioxide recovery equipment as well as the power consumed by the blower to overcome the pressure drop of the carbon dioxide recovery equipment (e.g., direct contact cooler and the absorber) may be significantly reduced in configurations according to the inventive subject matter when compared to numerous known configurations.

While exhaust gas recycling may be employed in numerous configurations that include a turbine driving a load (e.g., generator or compressor), it is generally preferred that plant configurations in which exhaust is at least partially recycled are plants that include a humid air turbine (HAT), and an exemplary plant that includes a HAT is described in U.S. Pat. No. 4,829,763 to Rao, which is incorporated by reference herein. Where contemplated configurations include a HAT cycle, it should be especially appreciated that previously existing difficulties of known HAT cycles may be overcome by contemplated carbon dioxide removal configurations. Among other things, previously known HAT cycle configurations typically required customized turbo machinery in which the compressor of the gas turbine needed to be significantly smaller than the expander. By removing carbon dioxide from the system in case of solvent based processes, or by removing carbon dioxide and other gaseous components in case of the membrane or autorefrigeration based processes upstream of the expander, additional water vapor can be supplied to the combustor and/or expander without significantly changing the relative flow of gas through the compressor and the expander of the engine. Therefore, contemplated configurations are not only expected to improve the economics of carbon dioxide recovery in gas turbine based plants, but also to implement carbon dioxide recovery to existing recuperated gas turbines (e.g., recuperated gas turbines commercially available from Sulzer Turbo or MIAN GHH Borsig).

Furthermore, it is contemplated that configurations and methods according to the inventive subject matter may also be utilized in relatively small power plants with a capacity of 10 MW or less to recover carbon dioxide from the combustion gases. Alternatively, contemplated configurations and methods may be included in all plants in which a gas turbine are employed to drive a compressor or generator.

It is still further contemplated that the so isolated carbon dioxide may be utilized in a variety of processes, and particularly contemplated processes include urea plants, and enhanced oil recovery. Alternatively, isolated carbon dioxide may be sold for medical or nutritional use, employed in freezing processes, or pumped into mines, the ocean, or other locations where carbon dioxide may be at least temporarily sequestered. The makeup water to the humidifier in contemplated configurations may be provided by various sources, including waste water (e.g., from within the plant), recycled water, or fresh water.

With respect to contemplated acid gas removal units, it should be recognized that all known processes for isolating carbon dioxide from a gas are suitable in conjunction with the teachings presented herein. However, particularly preferred methods and configurations include physical solvent based processes (see e.g., U.S. Pat. Nos. 2,863,527, 2,926,751, 3,505,784, 2,649,166, or U.S. Pat. No. 3,773,896, all incorporated by reference herein), chemical solvent based processes (see e.g., U.S. Pat. No. 3,563,695, or U.S. Pat. No. 2,177,068, both incorporated by reference herein), membrane processes (see e.g., U.S. Pat. No. 4,705,540 or U.S. Pat. No. 4,741,744, both incorporated by reference herein), and autorefrigeration (see e.g., U.S. Pat. No. 6,301,927, incorporated by reference herein).

Where carbon dioxide removal includes a membrane or solvent based process as shown in FIG. 1, it should be recognized that the quantity of recycled expanded exhaust 118B may vary considerably and will depend, among other factors, on the particular carbon dioxide removal unit and/or partial pressure of the carbon dioxide in the compressed mixed gas. Thus, it is generally contemplated that the amount of recycled expanded exhaust 118B may be within the range of 0 vol % and 100 vol % of the total expanded exhaust 118. However, and particularly where the exhaust gas has a relatively low carbon dioxide partial pressure, it is preferred that the amount of recycled expanded exhaust 118B is between about 25 vol % and 75 vol % of the total expanded exhaust 118.

Similarly, where autorefrigeration is employed as depicted in FIG. 2, it should be recognized that depending on the particular operational parameters the amount of compressed mixed gas stream 234B that is fed to the autorefrigeration unit may vary considerably. However, under most operating conditions, suitable quantities of compressed mixed gas stream 234B will be in the range between about 20 vol % and 80 vol %. Where contemplated configurations include a partial HAT configuration as depicted in FIG. 3, the quantity of mixed compressed gas 334A that is directly routed to the combustor may advantageously be between about 5 vol % and 50 vol %. However, depending on the particular configuration, the quantity of mixed compressed gas 334A may also be higher than 50 vol %. With respect to the cooled expanded exhaust gas stream 318B that is recycled back to the compressor, it is contemplated that suitable amounts will vary considerably. However, it is generally preferred that the amount of cooled expanded exhaust gas stream 318B will be in the range between about 25 vol % to about 75 vol %.

Mixing of the recycled cooled expanded exhaust gas stream may be performed in numerous manners, and all known manners of mixing are contemplated suitable herein. For example, where an existing plant is retrofitted to a configuration according to the inventive subject matter, mixing may be performed in a mixing vessel upstream of the compressor inlet. On the other hand, where a configuration according to the inventive subject matter is built from scratch, mixing may be performed by supplying recycled gas to the compressor inlet along with fresh air.

Therefore, the inventor generally contemplates that a plant may include a humid air turbine combustor that receives fuel and humid carbon dioxide depleted gas stream, wherein at least part of the humid carbon dioxide depleted gas stream is formed from an exhaust gas of the humid air turbine combustor. Such plants may advantageously further comprise a humidifier, wherein water used in the humidifier is heated by at least one of the compressed mixed gas and the exhaust gas. The term "carbon dioxide depleted gas stream" as used herein refers to any gas from which at least a portion of the carbon dioxide has previously been removed.

Viewed from another perspective, a plant in which carbon dioxide is removed from an exhaust gas of a turbine combustor will comprise a compressor that compresses air and at least a portion of the exhaust gas to form a compressed mixed gas, wherein carbon dioxide is removed from the compressed mixed gas in an acid gas removal unit.

Thus, specific embodiments and applications of humid air turbine cycles with carbon dioxide recovery have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A plant comprising:
    a combustor that is configured to combust a fuel in the presence of a humid gas stream, wherein the combustor is configured to produce an exhaust;
    an expander coupled to the combustor and configured to expand the exhaust to form an expanded exhaust;
    a compressor operationally coupled to the expander, wherein the compressor is configured to compress air in an amount sufficient for combustion of the fuel and at least a portion of the expanded exhaust to form a compressed mixed gas;
    an acid gas removal unit that removes carbon dioxide from the compressed mixed gas to form a carbon dioxide depleted compressed mixed gas; and
    a humidifier in line with the acid gas removal unit and compressor that humidifies the carbon dioxide depleted compressed mixed gas to form the humid gas stream, and wherein the combustor is further configured to receive the humid gas stream.

2. The plant of claim 1 wherein the plant is further configured such that the humid gas stream is heated using the exhaust as a heat source, and such that the heated humid gas stream is fed to the combustor.

3. The plant of claim 1 wherein the humidifier is configured to use water that is heated by at least one of the compressed mixed gas and the exhaust gas.

4. The plant of claim 1 wherein the acid gas removal unit comprises a solvent that absorbs at least part of the carbon dioxide.

5. The plant of claim 4 wherein the solvent is a chemical solvent.

6. The plant of claim 1 wherein the acid gas removal unit comprises a membrane unit.

7. The plant of claim 1 wherein the combustor is configured to allow feeding of at least part of the compressed mixed gas into the combustor.

8. The plant of claim 1 further comprising a cooler that is configured to cool the expanded exhaust to a degree sufficient to condense water from the expanded exhaust.

9. A plant comprising a humid air turbine combustor that receives fuel and a compressed humid carbon dioxide depleted gas stream, a compressor fluidly coupled to the combustor and configured to produce a compressed exhaust gas, a carbon dioxide removal unit fluidly coupled to and in line between the compressor and the combustor such that the carbon dioxide removal unit is downstream of the compressor and upstream of the combustor, a humidifier downstream of the compressor, and wherein the compressor, the humidifier, and the carbon dioxide removal unit are configured to allow formation of at least part of the humid carbon dioxide depleted gas stream from at least part of the compressed exhaust gas of the humid air turbine combustor.

10. The plant of claim 9 wherein the carbon dioxide removal unit comprises a membrane unit and is configured to extract carbon dioxide from the humid carbon dioxide depleted gas stream.

11. The plant of claim 9 wherein the carbon dioxide removal unit is configured to extract carbon dioxide from the humid carbon dioxide depleted gas stream using a physical solvent that absorbs at least part of the carbon dioxide.

12. The plant of claim 9 wherein the humidifier is configured such that water used in the humidifier can be heated by at least one of the compressed mixed gas and the exhaust gas.

13. A plant in which carbon dioxide is removed from an exhaust gas of a turbine combustor combusting a fuel comprising a compressor that is configured to compress a mixture of air in an amount sufficient for combustion of the fuel and at least a portion of the exhaust gas to form a compressed mixed gas, and further comprising an acid gas removal unit that is configured to allow removing carbon dioxide from a portion of the compressed mixed gas, wherein the turbine combustor is configured to allow feeding of the compressed mixed gas to the turbine combustor, and further comprising a humidifier in line downstream of the acid removal unit and upstream of the turbine combustor that provides water vapor to the compressed mixed gas in an amount effective to compensate for loss of motive fluid from carbon dioxide removal.

14. The plant of claim 13 wherein the acid gas removal unit comprises a membrane unit.

15. The plant of claim 13 wherein the acid gas removal unit comprises a solvent that absorbs at least part of the carbon dioxide.

16. The plant of claim 13 wherein the humidifier is configured such that water used in the humidifier can be heated by at least one of the compressed mixed gas and the exhaust gas.

* * * * *